United States Patent [19]

Vaughan et al.

[11] Patent Number: 5,148,703
[45] Date of Patent: Sep. 22, 1992

[54] VEHICLE INSPECTION TRAILER

[75] Inventors: Rodney G. Vaughan, Greenwich; Russell K. Findlay, Bradbury; Ivan Jakabek, Ermington; Ralph Richardson, Mainbar; Myles J. McLachlan, Balmain; Geoffrey C. Venn-Brown, Lane Cove, all of Australia

[73] Assignee: Roads & Traffic Authority of New South Wales, New South Wales, Australia

[21] Appl. No.: 692,779

[22] Filed: Apr. 26, 1991

Related U.S. Application Data

[63] Continuation of Ser. No. 442,344, Dec. 11, 1989, abandoned.

[30] Foreign Application Priority Data

Mar. 31, 1988 [AU] Australia ............................ PI7538

[51] Int. Cl.⁵ ............................................. G01L 5/28
[52] U.S. Cl. .................................................... 73/123
[58] Field of Search ................... 73/121, 123, 125–127, 73/130, 131, 117, 118.1, 123; 33/203, 203.12–203.16; 280/43.17–43.24

[56] References Cited

U.S. PATENT DOCUMENTS

| | | | |
|---|---|---|---|
| 2,091,656 | 8/1937 | Smalley | 73/51 |
| 2,478,795 | 8/1949 | Whalen et al. | 280/43.18 |
| 2,922,534 | 1/1960 | Vodraska et al. | 280/43.17 |
| 3,051,504 | 8/1962 | Bruvold | 280/43.18 |
| 3,277,702 | 10/1966 | Brenneke | 73/117 |
| 3,491,587 | 1/1970 | Morris et al. | 73/117 |
| 3,823,485 | 7/1974 | Lambrecht | 33/203.14 |
| 4,165,096 | 8/1979 | Lewis, Jr. et al. | 280/43.24 |
| 4,893,242 | 1/1990 | Rogers et al. | 73/126 |

FOREIGN PATENT DOCUMENTS

| | | | |
|---|---|---|---|
| 10704 | 12/1932 | Australia | 73/126 |
| 148867 | 4/1968 | Netherlands . | |
| 653530 | 3/1979 | U.S.S.R. . | |
| 1441413 | 6/1976 | United Kingdom | 73/126 |

*Primary Examiner*—Robert Raevis
*Attorney, Agent, or Firm*—Ladas & Parry

[57] ABSTRACT

A vehicle inspection facility comprises a horizontal base frame supporting a pair of brake testing sub-assemblies. Each sub-assembly comprises a driven roller and a companion roller, and includes means for rotating the driver roller for rotating the wheels of a vehicle being tested and means for measuring the braking force applied by the vehicle brakes against the driven roller. Also included is a vehicle suspension and steering testing assembly comprising a pair of horizontal supporting surfaces for supporting the vehicle front wheels and including means for producing reciprocal motion of the supporting surfaces along perpendicular directions to determine the degree of "play" of the wheels.

10 Claims, 13 Drawing Sheets

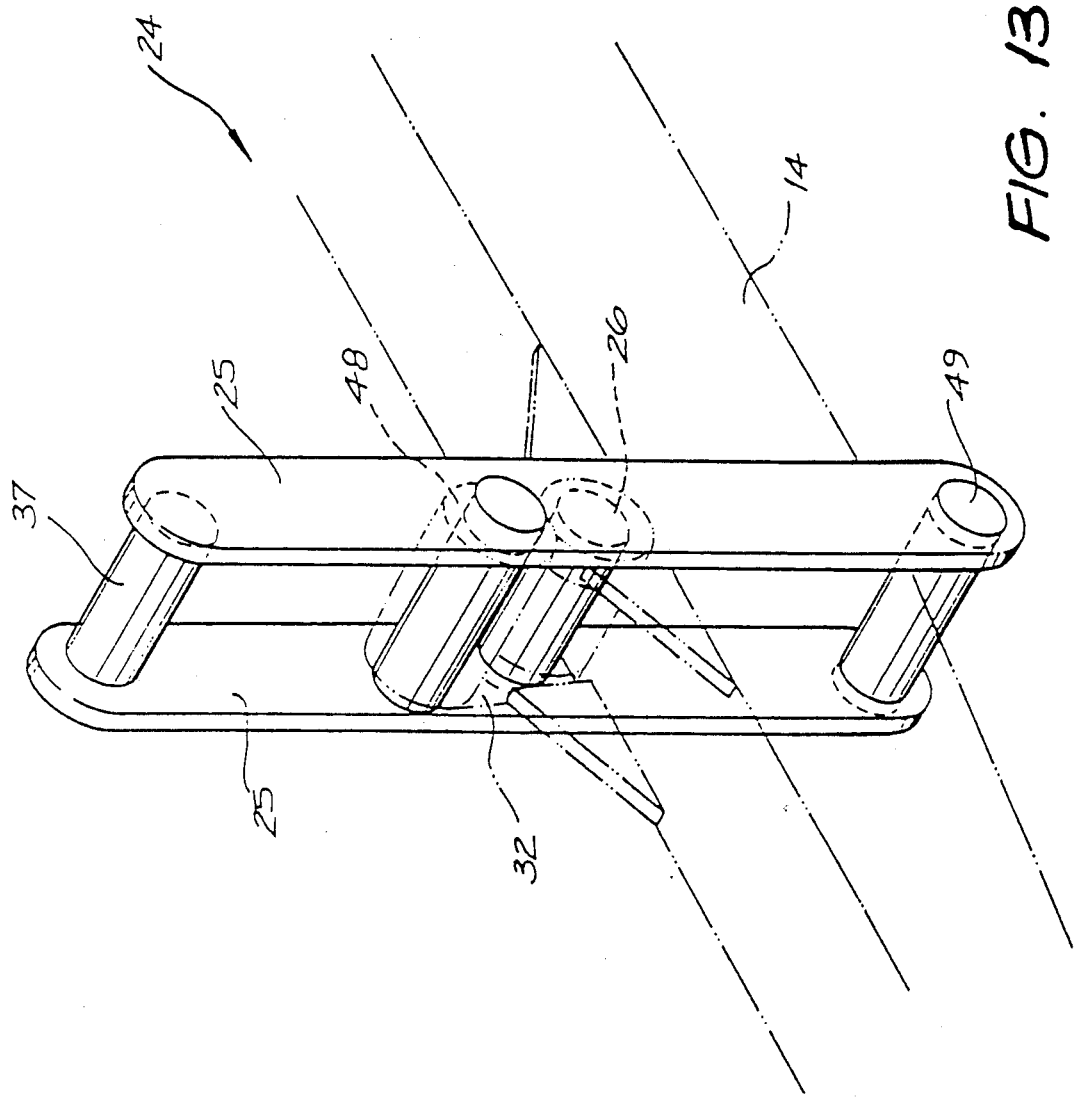

VEHICLE INSPECTION TRAILER

This is a continuation of copending application(s) serial number 07/442,344 filed on Dec. 11, 1989 (now abandoned) and International Application PCT/AU89/00141 filed on Mar. 31, 1989 and which designated the U.S.

BACKGROUND OF THE INVENTION

The present invention relates to apparatus for inspecting motor vehicles, and more particularly but not exclusively for inspecting public vehicles and motor lorries.

The Roads and Traffic Authority of New South Wales, Australia, conducts six-monthly and annual inspections of public vehicles (buses, taxis, etc) and heavy trucks respectively, together with random roadside monitoring inspections. These inspections are essential because of extremely poor maintenance of heavy vehicles when inspections are not conducted, and the involvement of these vehicles in fatal and serious crashes. Random and annual inspections have been proven effective in greatly improving heavy vehicle safety maintenance. There is growing interest in, and acceptance of, the need for random inspections of heavy vehicles. This is not only occurring in other Australian states, but also in Europe and in the United States.

DISCUSSION OF PRIOR ART

Ideally, all vehicle safety inspections should be conducted using roller brake testing machines and steering-/suspension testing machines, such as are installed in Department of Motor Transport Vehicle Inspection Stations. By definition, random roadside inspections cannot be undertaken at such stations. Furthermore, because of the geographic spread of vehicles, less than half of annual truck inspections (and six-monthly public vehicle inspections) are conducted at such stations.

Vehicles inspected away from stations are tested to a substantially lower standard in that they are not tested using roller-brake testing machines and steering/suspension testing machines. This is particularly important because braking faults constitute 50% of all major defects found, while steering/suspension faults amount to another 30% (these results are not only applicable in New South Wales, but are typical of those found around the world).

Standard roller brake testing machines are expensive, heavy and require substantial electrical power supplies. They also require installation pits to mount them such that vehicles can drive onto the machines, and to withstand reaction forces during brake tests. Steering/suspension testing machines require inspection pits to accommodate associated jacking of vehicles, and require electrical/air/hydraulic power supplies. They are also expensive.

OBJECT OF THE INVENTION

Vehicle fleet owners have had their vehicles tested, in respect of braking a steering/suspension, at installations generally remote from their own premises and by a organisation not under their control. This leads to time lost, as the vehicle has to be driven to the installation, and the driver will most likely have to await for the vehicle to be tested before returning.

Accordingly there is a need for a vehicle testing and inspection facility suitable for the needs of vehicle fleet owners.

It is the object of the present invention to overcome or substantially ameliorate the above disadvantages.

SUMMARY OF THE INVENTION

There is disclosed herein a vehicle inspection facility, said facility comprising:

a generally horizontally extending base frame to be supported as a ground surface;

a brake testing assembly comprising two sub-assemblies arranged such that the wheels on an axle of a vehicle being tested are supported by the two sub-assemblies, each sub-assembly includes at least two rollers adapted to engage a test vehicle wheel, said rollers being rotatably supported on said base so as to be rotatable about two generally parallel coextensive axes, motor means to drive at least one of said rollers, and indicator means which provide an indication of the resistance applied to the driven roller by a braking system associated with the wheel being tested by the brake testing assembly; and a steering and suspension play detection assembly including a jack to raise a test vehicle, a pair of movable members upon which front wheels of the test vehicle rest, and means to move the plates in unison in a first horizontal direction and/or a second direction transverse of the first direction.

In one preferred construction of the above described facility, the base frame has at least two wheels enabling the facility to be transported, with the base being adapted to be movable between a vehicle inspection position resting on a ground surface, and a raised transport position. The generally parallel co-extensive axis of the rollers extend generally longitudinally of the facility, and said first horizontal direction is generally longitudinally of the facility and said second direction is generally transverse of the facility.

There is further disclosed herein a vehicle steering and suspension inspection facility to test a vehicle having a pair of front dirigible wheels, said facility comprising;

a base frame to be supported on a ground surface; and a steering and suspension plate detection assembly mounted on the frame, said assembly including a jack to raise the front of the vehicle; a pair of wheel engaging surfaces mounted relative to the jack so that each surface receives a respective one of the pair of dirigible wheels, said jack being operable to raise the vehicle so as to minimize the weight supported by said surfaces, mountings supporting said surfaces for movement in a first direction transverse of the longitudinal axis of said vehicle, and a second direction extending longitudinally of the vehicle, motor means to move said surfaces in unison in said two directions so that said wheels are biased to move in said direction with said surfaces.

BRIEF DESCRIPTION OF THE DRAWINGS

A preferred form of the present invention will now be described by way of example with reference to the accompanying drawings, wherein:

FIG. 13 is a schematic perspective view of a portion of the clamp assembly of FIG. 12.

DESCRIPTION OF THE PREFERRED EMBODIMENT

Figure 1:
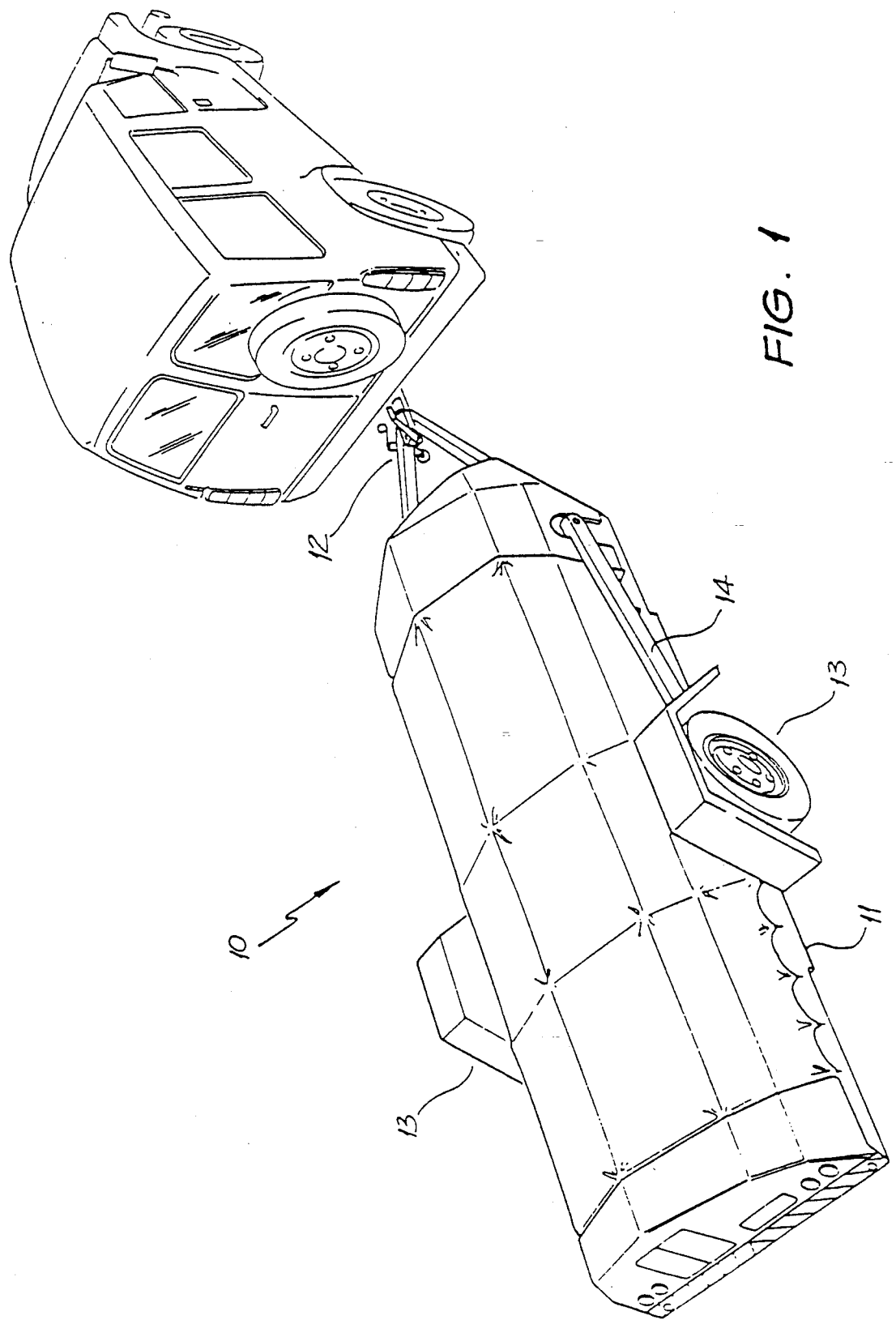
FIG. 1 is a schematic perspective view of a mobile testing facility to test motor vehicles, with the facility in its transport configuration.

In the accompanying drawings there is schematically depicted a mobile facility 10 to test brakes, steering and suspensions of motor vehicles, particularly heavy vehicles and public vehicles. The facility 10 includes a base frame 11 having its forward end provided with a towing hitch 12 enabling the facility 10 to be towed by a motor vehicle. Mounted on the frame 11 are wheel assemblies 13, with each assembly 13 including an arm 14 pivotally mounted by means of a bearing assembly 15. The two bearing assemblies 15 provide for pivoting of the arms 14 about a common axis transverse of the general direction of travel of the facility 10. Rotatably mounted at the ends of the arms 14 are wheels 16 covered by guards 17.

The arms 14 are pivoted about their common pivot axis by means of hydraulic motors 18. The arms 14 are movable between a transport position, with the wheels 16 engaging a ground surface, and a raised position allowing the frame 11 to rest on the ground surface. Extending between the arms 14 and mounted thereon so as to be fixed thereto, is an axle 21 which pivotally supports each of the wheel assemblies 13. Each wheel assembly 13 includes a pivot member 19 extending radially from the longitudinal axis of the axle 21, with each member 19 supporting a stub axle 20. The stub axle 20 supports bearings which rotatably support the associated wheel 16. The axle 21 is attached to the arms 14 via mountings 22. Fixed to the base frame 11 are two plates 23 which co-operate with clamps 24 to selectively secure the arms 14 to the base frame 11 when the facility 10 is in the transport mode of operation. Each clamp 24 includes a pair of links 25 pivotally mounted on the associated arm 14 via a roller 26. Also extending between the links 25 are rollers 37, 48 and 49, with the roller 49 being adapted to engage beneath the plate 23. Extending between the roller 26 and 48 are a pair of brackets 32 which pivotally attach the rollers 26 and 48, with the links 25 then being able to pivot about the roller 48. Also attached to the links 25 is a lever 50 provided with a handle 51. During use of the clamp assembly 24, the links 25 are manipulated by the user until the roller 49 engages with the plate 23. This is achieved by gripping the links at the roller 37. Once in this initial position, the handle 50 will be projecting up at an acute angle relative to the associated arm 14. The user then grabs the handle 51 and pushes the handle 51 towards the associated arm 14. This will cause pivotting of the links 25 to an "over centre" position retaining the roller 49 firmly sandwiching the plate 23 against the associated arm 14.

Each of the members 19 has extending from it a sub-axle 52 extending into the interior of the axle 21. The axle 21 is not of a circular transverse cross-section. More particularly it has longitudinally extending lobes 53 which provide longitudinally extending cavities to receive resilient elements 54. The sub-axle 52 has lobes 64 which also abut the resilient elements 54. Accordingly, rotation of the sub-axle 52 relative to the axle 21 is inhibited by the resilient elements 54.

Figure 2:
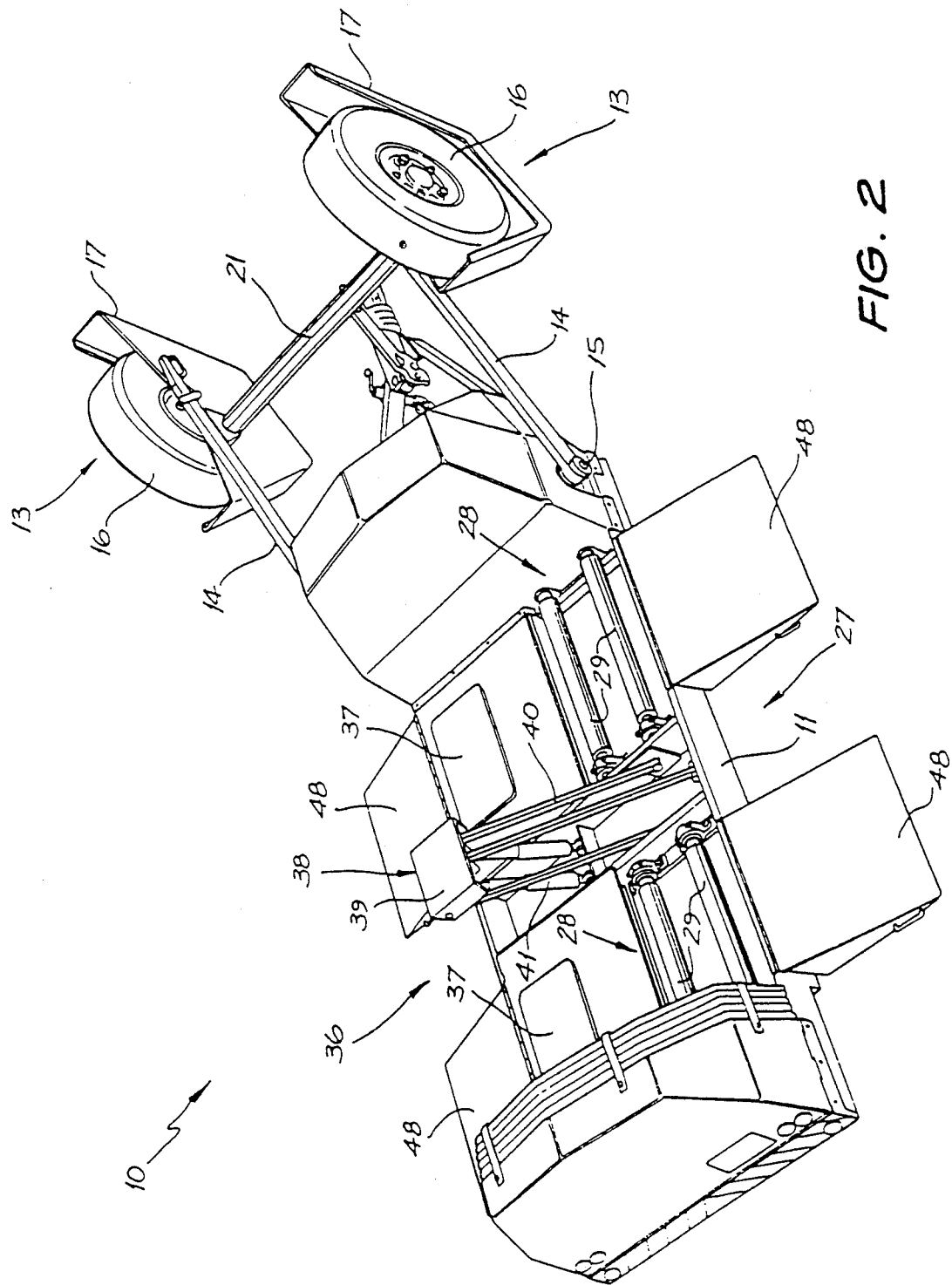
FIG. 2 is a schematic perspective view of the facility of FIG. 1, in its testing configuration.
Figure 3:
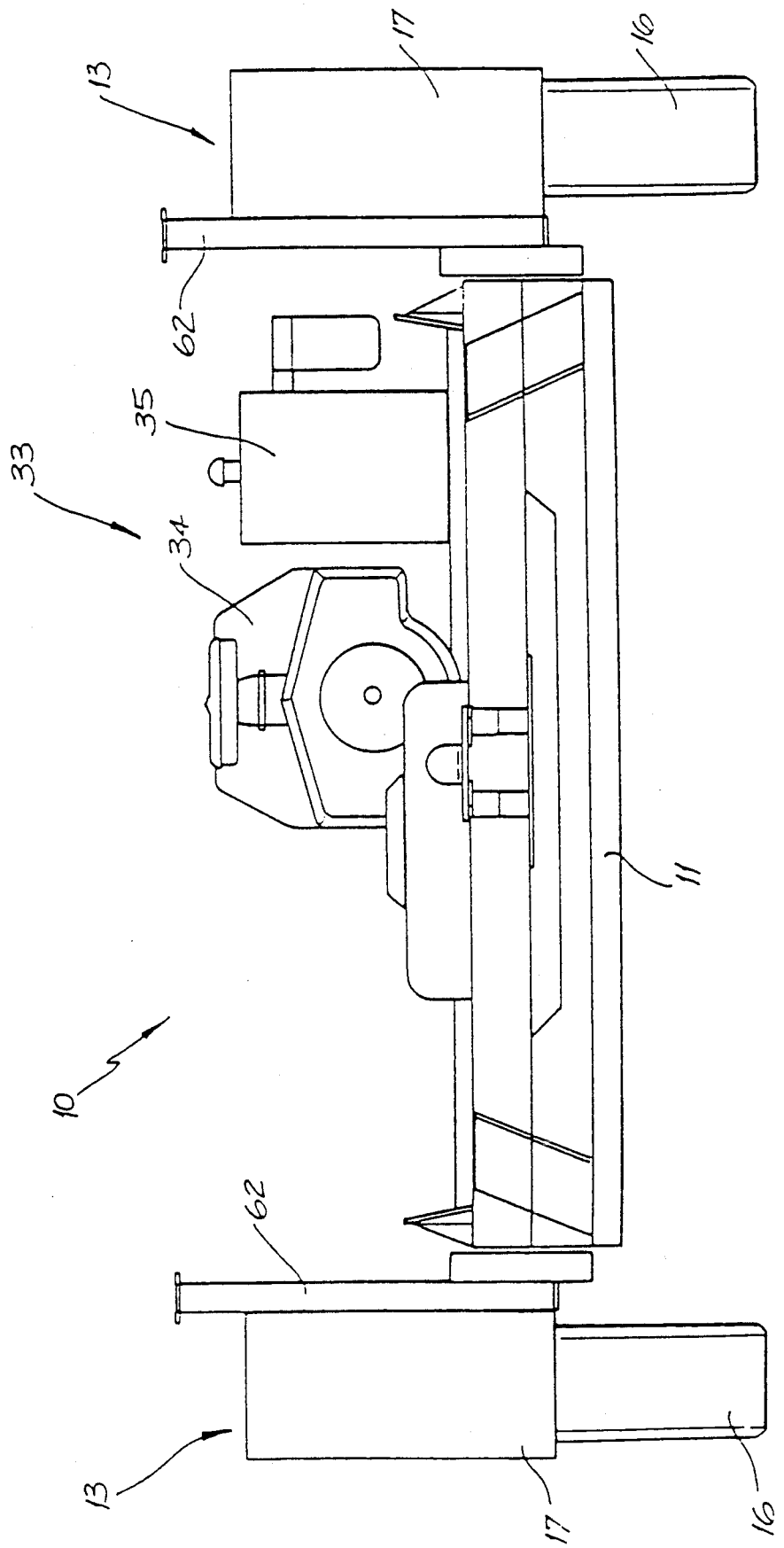
FIG. 3 is a schematic front end elevation of the facility of FIG. 1.
Figure 4:
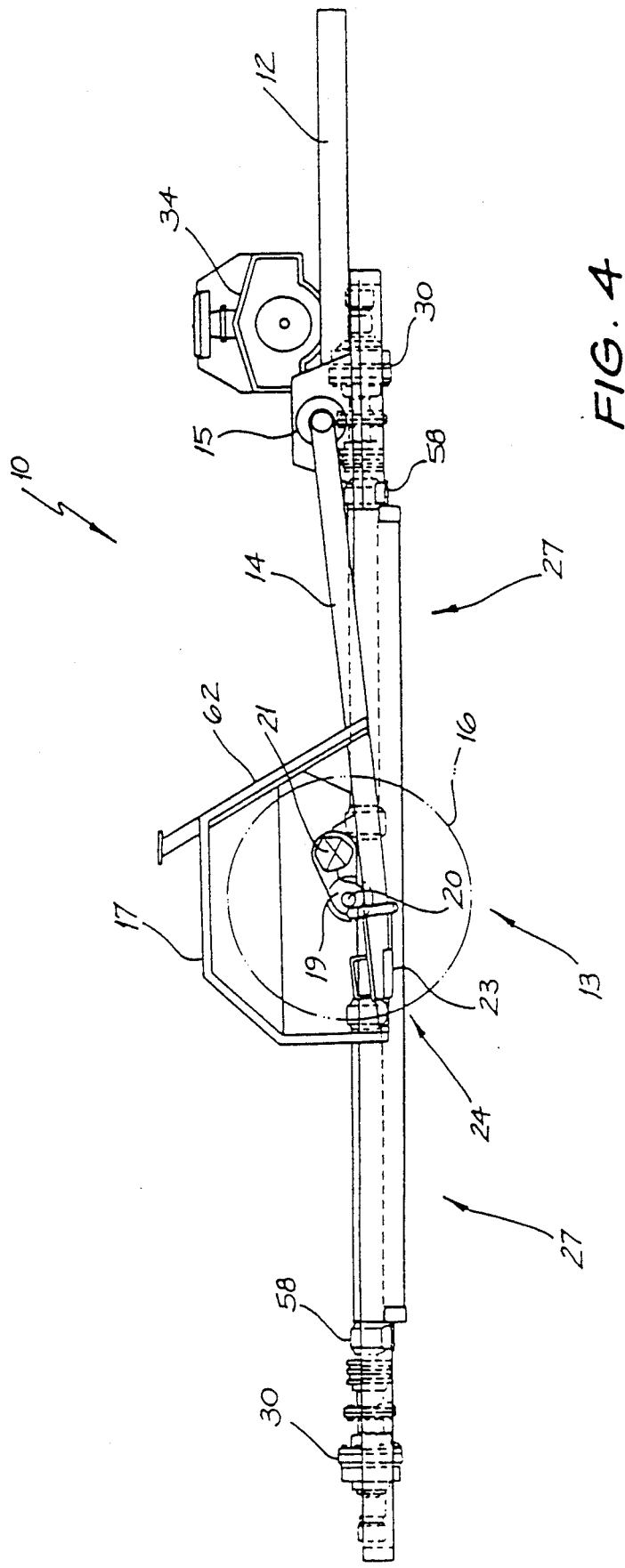
FIG. 4 is a schematic side elevation of the facility of FIG. 1.
Figure 5:
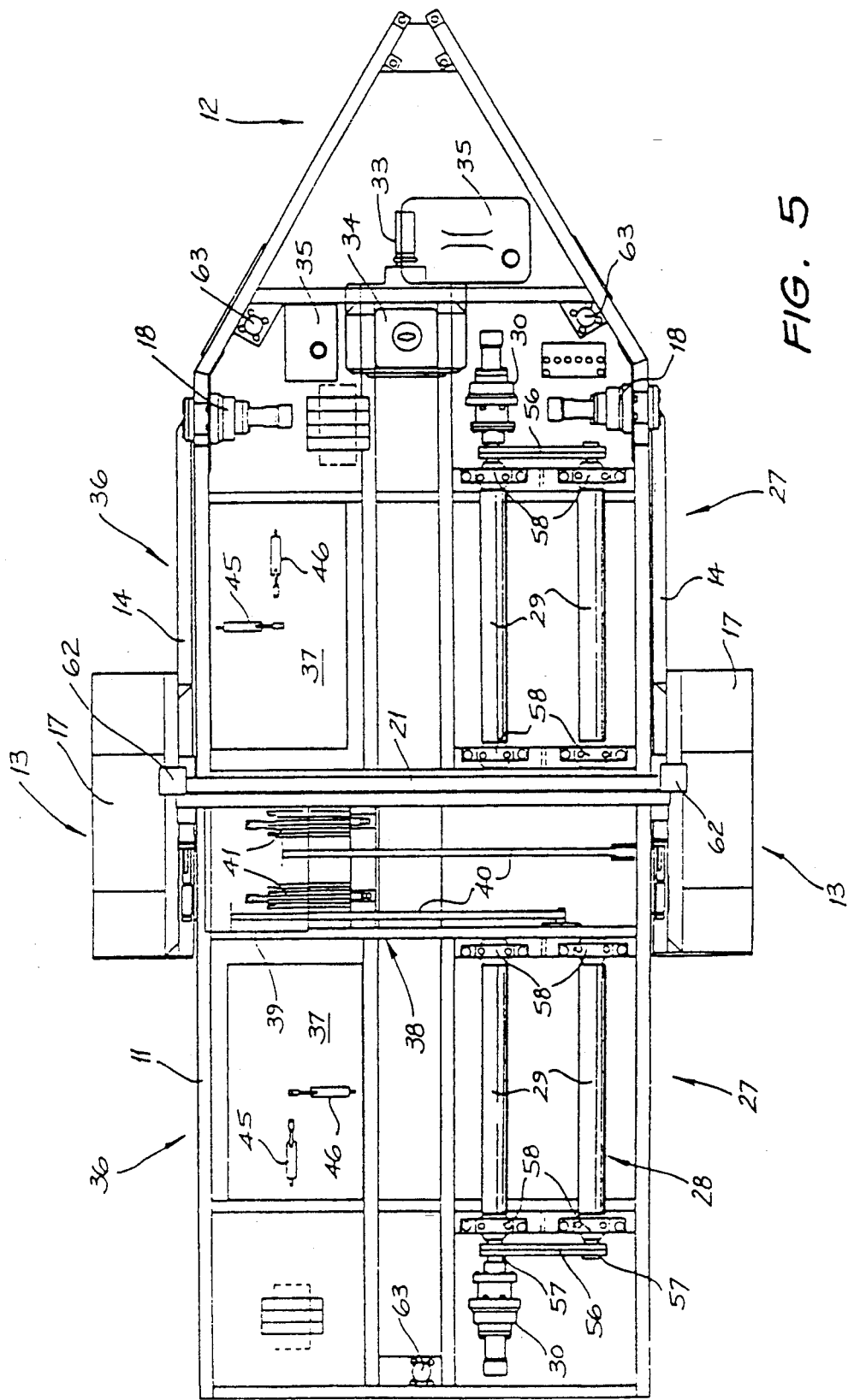
FIG. 5 is a schematic top plan view of the facility of FIG. 1.
Figure 6:
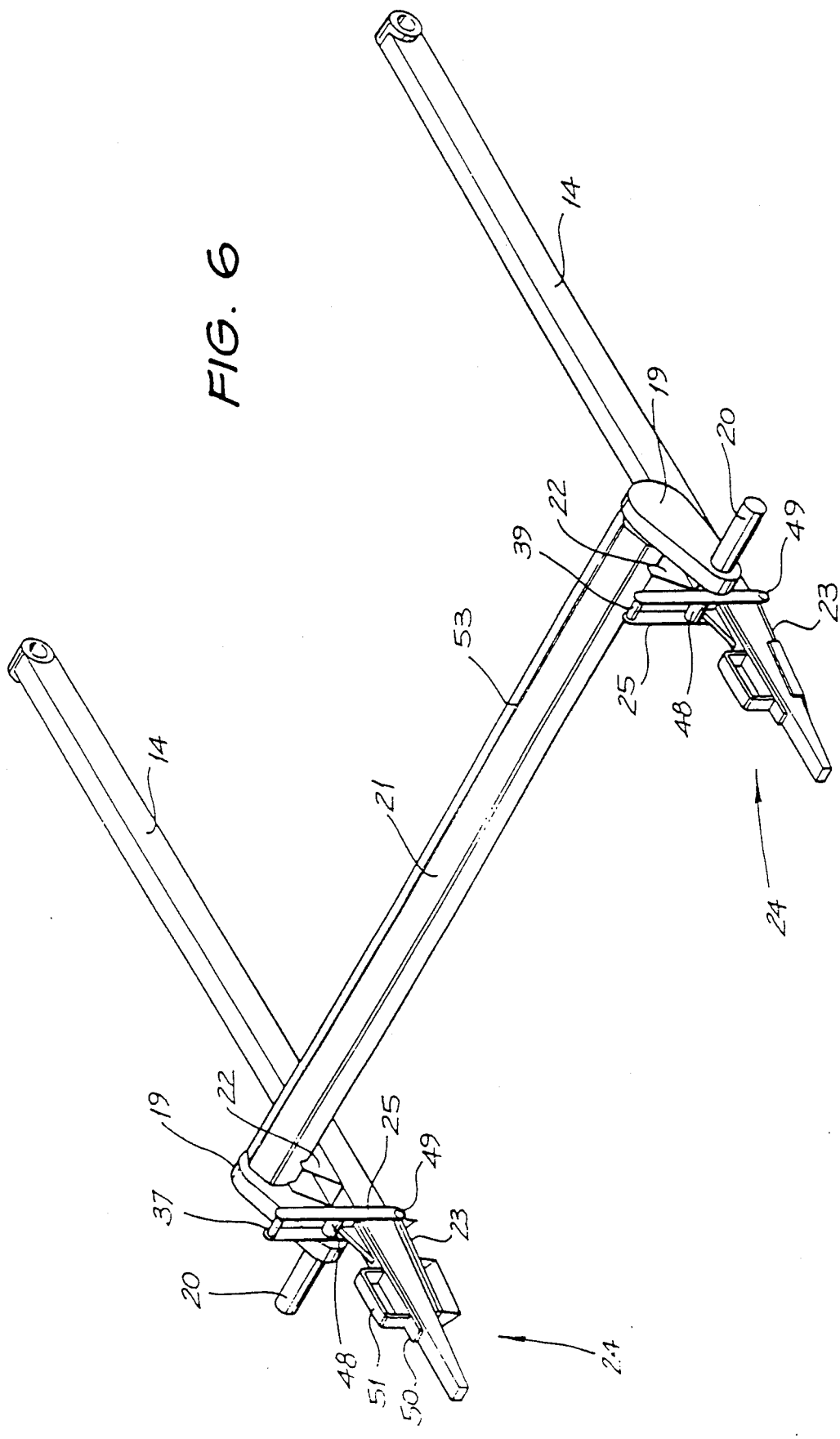
FIG. 6 is a schematic perspective view of the suspension of the facility of FIG. 1.
Figure 7:
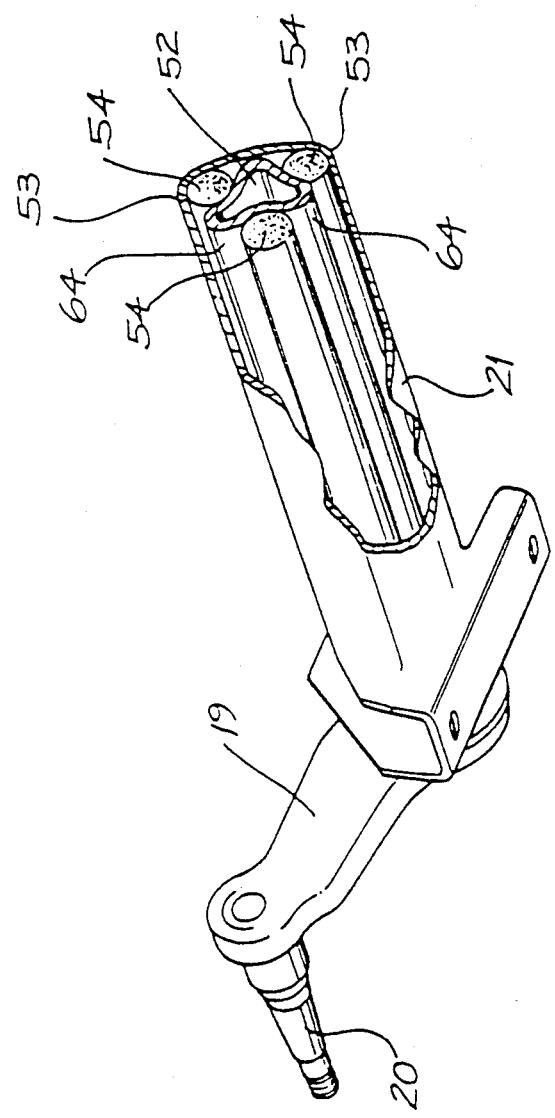
FIG. 7 is a schematic sectioned elevation of the axle of the suspension of FIG. 6.
Figure 8:
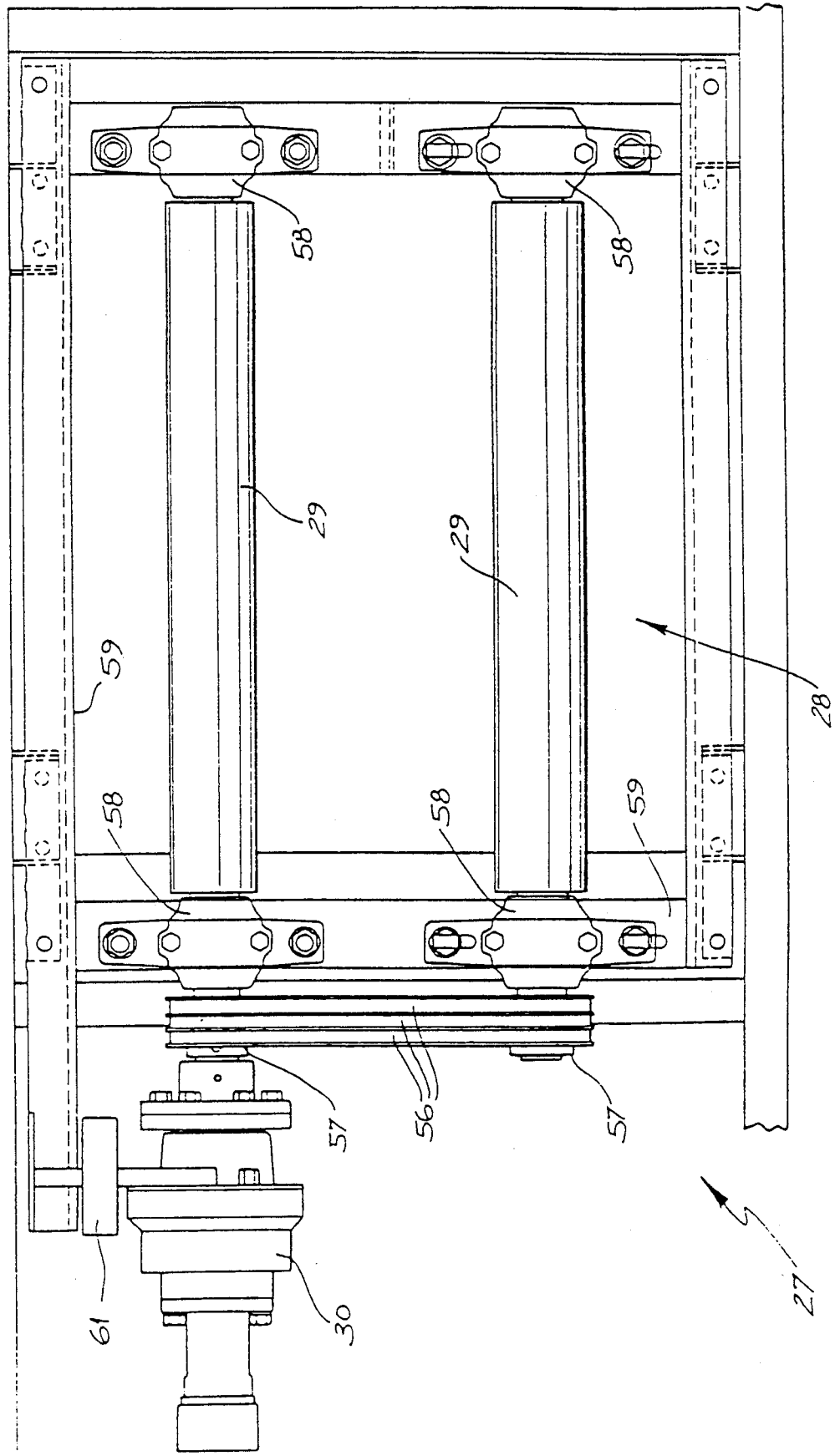
FIG. 8 is a schematic top plan view of a brake testing assembly of the facility of FIG. 1.
Figure 9:
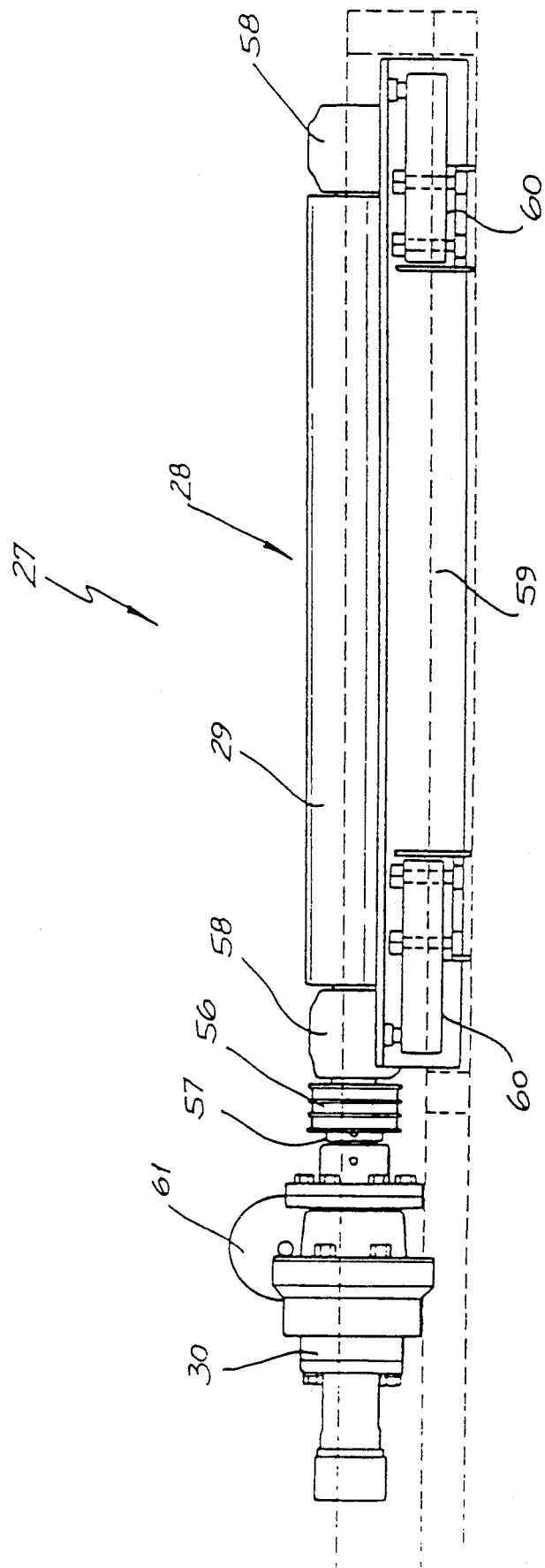
FIG. 9 is a schematic side elevation of the assembly of FIG. 8.
Figure 10:
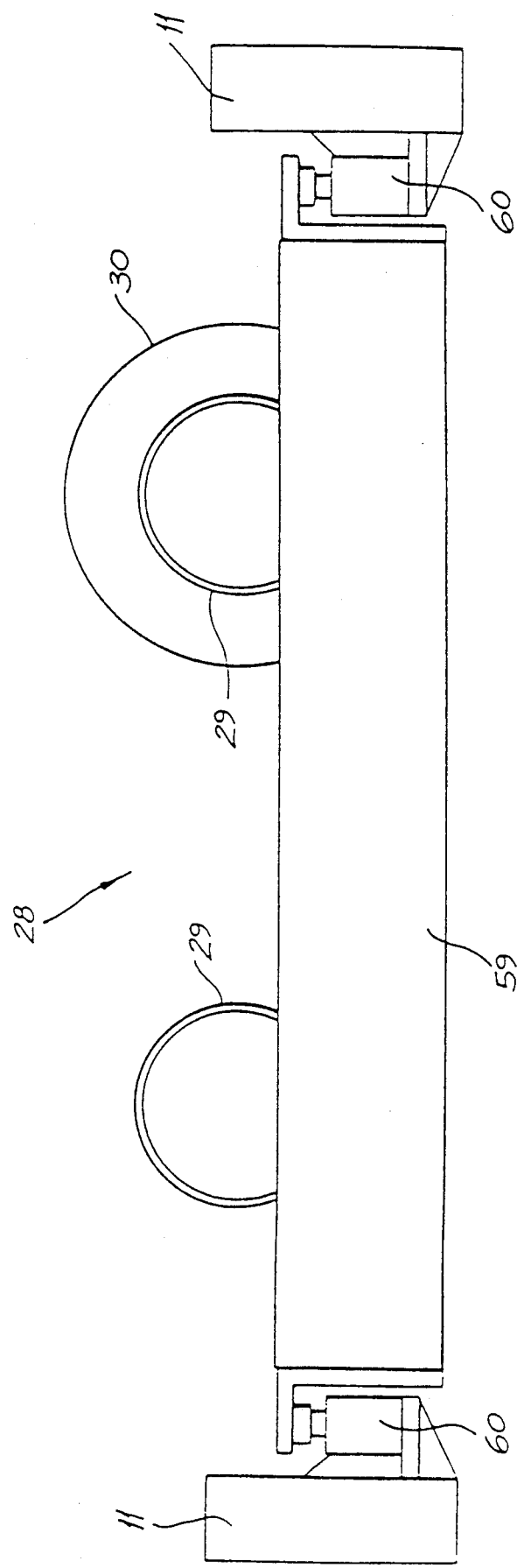
FIG. 10 is a schematic end elevation of the assembly of FIG. 9.

The wheel assemblies 13 are shown in their transport position, in FIG. 1, while the wheel assemblies 13 are shown in a raised position in FIG. 2, enabling the frame 11 to rest on a ground surface.

With reference to FIG. 1, the facility 10 has a front end hitched to the towing vehicle and a rear end. Although not shown, it is convenient to refer to a horizontal axis of the facility which extends between the front and rear ends and which divides the frame (FIG. 2) into two sides each of which extends between the front and rear ends.

Mounted on the frame 11 on one of the two aforementioned sides, that is, the right-hand side when looking down at the frame 11 as shown in FIG. 2, is a roller brake testing assembly 27, including two sub-assemblies. The sub-assemblies provide two sets of rollers 28. Each set of rollers 28 includes two rollers 29. The rollers 29 are driven by means of hydraulic motors 30. Extending between each pair of rollers 29 are drive belts 56 extending between pulleys 57. Via the pulleys 57 and belts 56, driving motion is transferred between the two rollers 29. The rollers 29 are also supported by bearing blocks 58 supported on a sub-frame 59. The sub-frame 59 in turn is supported on load cells 60, which load cells can provide a signal indicative of the weight carried by the wheels being tested. In order to provide a reaction torque for the motors 30, there is provided a reaction member 61 extending to the sub-frame 59. The load cell 60 are each in turn supported on the base frame 11. The motors 30 receive hydraulic fluid under pressure from a pump 33 driven by a petrol engine 34. The pump 33 has associated with it a reservoir 35.

Also mounted on the frame 11 on the other of the two aforementioned sides of the frame is a suspension/steering testing assembly 36 each having an upper horizontal wheel supporting surface, which includes a pair of plates 37 which are movably mounted on the frame 11 so as to be movable in a direction longitudinally of the facility 10, as well as transverse of the facility 10. The assembly 36 also includes a jack 38 having an upper plate 39 to engage and raise the forward end of the vehicle being tested. The jack 38 includes a parallelogram assembly 40 operated by hydraulic rams 41.

The plates 37 are each associated with a pair of hydraulic rams which move the plates 37 longitudinally or transverse of the facility 10. The plates 37 may be moved in unison either in the same direction, or in opposite directions. The plates 37 provide horizontal surfaces 61 which receive the wheels 16.

Figure 11:
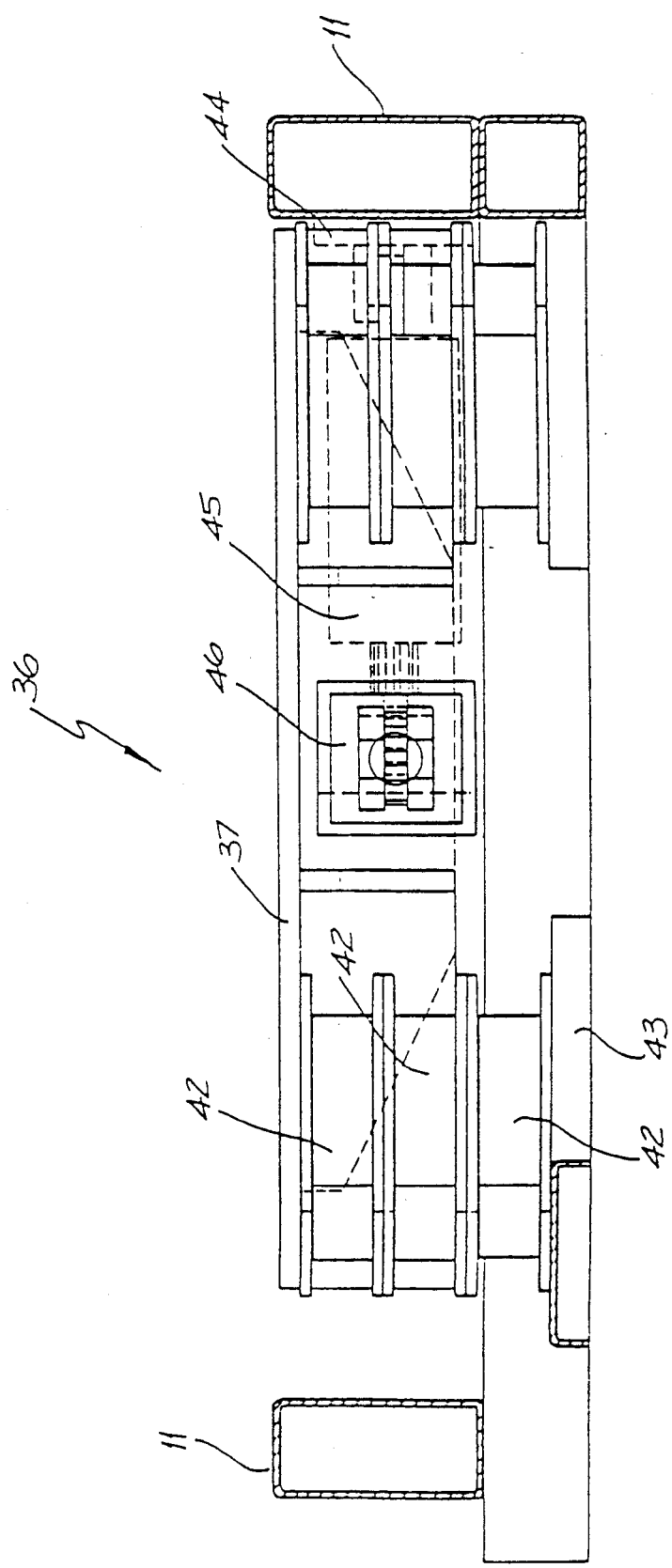
FIG. 11 is a schematic side elevation of a suspension and steering testing assembly employed in the facility of FIG. 1.
Figure 12:
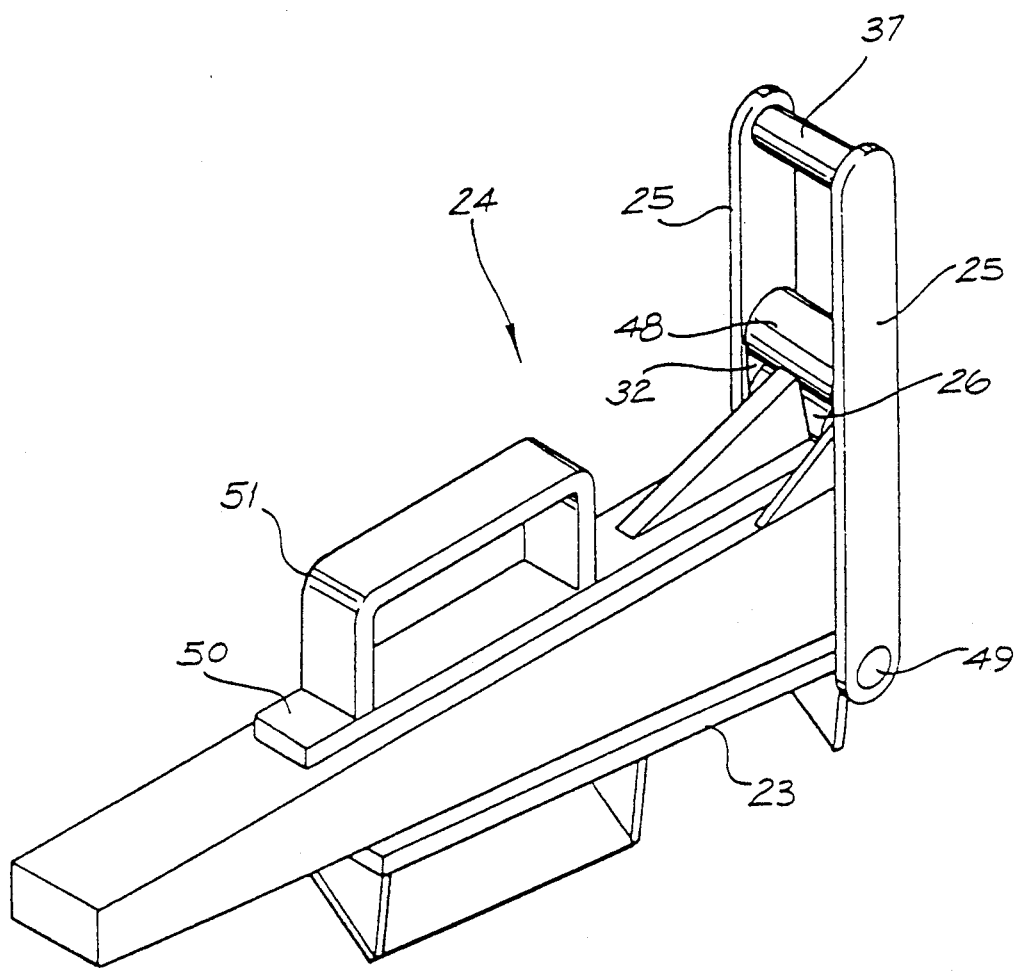
FIG. 12 is a schematic perspective view of a clamp employed with the suspension of FIG. 6.

In FIG. 11 one of the plates 37 is illustrated. The plate 37 is supported by a stack of resilient pads 42 further attached to a member 43. The plate 37 is moved by means of hydraulic rams 45 and 46, with the hydraulic ram 45 moving the plate 37 longitudinally of the facility 10, and the ram 46 moving the plate 37 transverse of the facility 10. There is positioned adjacent the plate 37 stop members 44 which restrict the downward movement of the plate 37. Initially when a vehicle wheel is located on the plate 37, the plate 37 moves downward until it engages a stop 44. Thereafter, the jack 38 is operated until the plate 37 is free for movement and is clear of the stop 34. In this position, the wheels are in sufficient frictional contact with the plate 37 to move therewith or to slide relative thereto. Accordingly, a force is applied to the wheel biasing the wheel to move in the direction of movement of the plate 37.

Attachable to the longitudinal side edges of the frame 11 are ramp assemblies 48. The ramp assemblies 48 are long enough to ensure that any legal vehicle will not "ground" while crossing the trailer for moving the vehicle front wheels onto the rollers 29 for the brake testing and then onto the plates 37 for the steering and suspension testing.

For compactness and ease of operation, the sets of rollers 28 are aligned transversely of the facility 10, with the plates 37.

In use of the brake testing assembly, the rollers 29 are driven via their hydraulic motors 30. The wheels of the vehicle under test, are braked and the torque applied by the motors 30 measured. This could be achieved by producing a signal proportional to the pressure delivered to the motors 30. Alternatively the load cells 60 could provide the signal. An electronic control system would then transfer the signal to an electronic control unit with a brake force and a brake balance readout. The unit could be a hand-held item. Preferably, the rollers 29 can be rotated in either direction. When the steering and suspension test is to be carried out, the operator activates the jack 38 to raise the vehicle so that the wheels under test are only just in engagement with the plates 37. Thereafter, the plates 37 are moved either longitudinally or transverse of the facility 10 to provide the operator with an indication of the condition of the steering and suspension of the vehicle. The wheels would be biased to move with the plates 37 due to frictional contact therewith.

The above described form of the present invention provides a facility for testing motor vehicle brakes, steering and suspensions independently of a fixed station and their facilities and power supplies. However it should be appreciated that it could be fixed to a particular site to provide a stationary facility.

Preferably the facility is designed for legal towing by a light commercial vehicle. It can be towed to a site and placed in operation quickly and simply.

Preferably each of the arms 14 would be provided with a stand 62 which would support the wheel assemblies in the displaced position depicted in FIG. 2. This would then prevent the arms 14 providing a torque tending to raise the frame 11 from good frictional contact with the ground supporting surface. Preferably the portions of the frame 11 contacting the ground surface would be provided with a friction enhancing substance such as rubber or resilient plastics material to prevent movement of the device 11 during brake testing.

To raise the frame 11 when the wheels are being moved to their transport mode of operation, there is provided three hydraulic rams 63. These rams would also be actuated when the wheels are being moved to the raised test mode position of the facility 11.

We claim:

1. A mobile vehicle inspection facility, said facility comprising:
   a generally horizontally extending base frame having a horizontal axis dividing said frame into first and second sides;
   a brake testing assembly mounted on said first side of said base frame and comprising two sub-assemblies arranged such that the wheels on an axle of a vehicle being tested are supported by the two sub-assemblies, each sub-assembly comprising at least two rollers adapted to engage a test vehicle wheel, said rollers being rotatably supported on said base frame so as to be rotatable about two generally parallel coextensive axles, first motor means for driving at least one of said rollers of each sub-assembly, and sensor means which provide an indication of the resistance applied to the driven roller by a braking system associated with the wheel being tested by the brake testing assembly;
   a steering and suspension play detection assembly mounted on said second side of said base frame and including a jack to raise a test vehicle, a pair of movable members upon which front wheels of the test vehicle rest, and second motor means to move the movable members in unison in a first horizontal direction or a second direction transverse of the first direction; and
   at least two wheels rotably mounted on a support movable between an inspection position where the wheels are raised above a ground surface so that the base frame is resting on said ground surface, and a transport position where the base frame is supported on said wheels for enabling the facility to be transported;
   wherein said movable members of said play assembly are aligned with said two sub-assemblies of said brake testing assembly in a direction transverse to said axis so that a vehicle being tested may move transversely of said axis between said brake testing assembly and said steering and suspension play detection assembly.

2. A mobile inspection facility, said facility comprising:
   a generally horizontally extending base frame;
   a brake testing assembly mounted on said base frame and comprising two sub-assemblies arranged such that the wheels on an axle of a vehicle being tested are supported by the two sub-assemblies, each sub-assembly comprising at least two rollers adapted to engage a test vehicle wheel, said rollers being rotatably supported on said base frame so as to be rotatable about two generally parallel coextensive axles, first motor means for driving at least one of said rollers of each subassembly, and sensor means which provide an indication of the resistance applied to the driven roller by a braking system associated with the wheel being tested by the brake testing assembly;
   a steering and suspension play detection assembly mounted on said base frame and including a jack to raise a test vehicle, a pair of movable members upon which front wheels of the test vehicle rest, and second motor means to move the movable members in unison in a first horizontal direction or a second direction transverse of the first direction; and
   at least two wheels rotatably mounted on a support movable between an inspection position where the wheels are raised above a ground surface so that the base frame is resting on said ground surface, and a transport position where the base frame is supported on said wheels for enabling the facility to be transported;

said movable members of said play assembly being aligned with said two sub-assemblies of said brake testing assembly so that a vehicle being tested may move across said base frame between said brake testing assembly and said steering and suspension play detection assembly.

3. The facility of claim 2, wherein said facility has front and rear ends and an axis extending therebetween, said wheels being supported by a pair of spaced apart arms extending parallel to said axis and pivotally mounted so as to be pivotable about a horizontal axis extending generally transverse to said axis, and an axle extending between said arms, which axle is located above said base frame and which supports said wheels.

4. The facility of claim 3, wherein said arms are pivotable to move said wheels from the transport position to a position spaced forward of said transport position so as to clear a passage for the vehicle being tested to move transversely of the facility between said brake testing assembly and said steering and suspension play detection assembly.

5. The facility of claim 4, wherein each sub-assembly is supported on said base frame by a weight detection means, so that each weight detection means can provide a signal indicative of the weight supported by the sub-assembly.

6. The facility of claim 4, wherein each steering and suspension play detection assembly includes a plurality of resilient pads which movably support said movable members for movement in said first and second directions, which pads are compressable so that said members are movable between an inoperative position when the full weight of a wheel is applied thereto, and an operative position when the load applied to said members is reduced.

7. The facility of claim 2, wherein the second motor means includes a pair of rams, which extend in the first and second directions.

8. A mobile vehicle inspection facility comprising:
a generally horizontally extending base frame having front and rear ends and first and second sides each extending between said front and rear ends,
a brake testing assembly mounted on said first side of said base frame and a steering and suspension play detection assembly mounted on said second side of said base frame, said two assemblies being aligned in a direction transverse to an axis extending between said front and rear ends so that a vehicle being tested can move transversely of said axis between said assemblies, and
at least two wheels rotatably mounted on support arms movable between an inspection position where the wheels are raised above a ground surface so that the base frame is resting on the ground surface, and a transport position where the base frame is supported on said wheels for enabling the facility to be transported, and said arms being pivotable to move said wheels from the transport position to a position spaced forward of said transport position so as to clear a passage for the vehicle being tested to move transversely of said axis between said brake testing assembly and said steering and suspension play detection assembly.

9. The facility of claim 8, wherein said brake testing assembly is supported on said base frame by a weight detection means, so that said weight detection means can provide a signal indicative of the weight supported by the brake testing assembly.

10. The facility of claim 8, wherein said steering and suspension play detection assembly includes a jack to raise a test vehicle, a pair of movable members upon which front wheels of the test vehicle rest, a motor means to move the movable members in unison in a first horizontal direction or a second direction transverse of the first direction, and a plurality of resilient pads which movably support said movable members for movement in said first and second directions, which pads are compressable so that said members are movable between an inoperative position when the full weight of a wheel is applied thereto, and an operative position when the load applied to said members is reduced.

* * * * *